US005434459A

United States Patent [19]

Pinkerton

[11] Patent Number: 5,434,459

[45] Date of Patent: Jul. 18, 1995

[54] PULSED POWER LINEAR ACTUATOR AND METHOD OF INCREASING ACTUATOR STROKE FORCE

[75] Inventor: Joseph F. Pinkerton, Austin, Tex.

[73] Assignee: Magnetic Bearing Technologies, Inc., Austin, Tex.

[21] Appl. No.: 147,887

[22] Filed: Nov. 5, 1993

[51] Int. Cl.$^6$ .......... H02K 7/06; H02K 41/00

[52] U.S. Cl. .......... 310/20; 310/12

[58] Field of Search .......... 310/15, 17, 20, 23, 310/12

[56] References Cited

U.S. PATENT DOCUMENTS

| | | | |
|---|---|---|---|
| 3,573,513 | 4/1971 | Hayosh et al. | 310/14 |
| 3,584,496 | 6/1971 | Keller | 72/430 |
| 3,693,033 | 9/1972 | Troesh | 310/14 |
| 3,755,700 | 8/1973 | Buschmann et al. | 310/30 |
| 3,772,669 | 11/1973 | Johnston et al. | 340/224 |
| 4,037,122 | 7/1977 | Bonner et al. | 310/14 |
| 4,200,831 | 4/1980 | Weldon et al. | 322/8 |
| 4,352,048 | 9/1982 | Schulze | 318/135 |
| 4,458,227 | 7/1984 | Petersen | 335/222 |
| 4,494,022 | 1/1985 | Kawara et al. | 310/14 |
| 4,808,955 | 2/1989 | Godkin et al. | 335/222 |
| 4,892,328 | 1/1990 | Kurtzman et al. | 280/707 |
| 4,912,343 | 3/1990 | Stuart | 310/14 |
| 4,990,805 | 2/1991 | Zieve | 310/27 |
| 4,992,766 | 2/1991 | Suzuki et al. | 335/223 |
| 4,999,531 | 3/1991 | Mavadia et al. | 310/15 |
| 5,012,967 | 5/1991 | Johansson | 227/7 |
| 5,016,238 | 5/1991 | Shtipelman et al. | 369/215 |
| 5,047,676 | 9/1991 | Ichikawa | 310/12 |
| 5,081,381 | 1/1992 | Narasaki | 310/12 |
| 5,099,158 | 3/1992 | Stuart et al. | 310/14 |
| 5,138,291 | 8/1992 | Day | 335/258 |
| 5,153,475 | 10/1992 | McSparran | 310/254 |
| 5,154,075 | 10/1992 | Hahn et al. | 72/348 |
| 5,155,399 | 10/1992 | Zimmermann | 310/23 |
| 5,162,767 | 11/1992 | Lee et al. | 335/255 |
| 5,170,144 | 12/1992 | Nielsen | 335/229 |
| 5,187,398 | 2/1993 | Stuart et al. | 310/14 |
| 5,212,977 | 5/1993 | Stuart | 72/347 |
| 5,214,337 | 5/1993 | Ishibashi | 310/268 |
| 5,214,561 | 5/1993 | Morita | 361/187 |

OTHER PUBLICATIONS

M. L. Spann et al. "Compulsator Research At the University of Texas At Austin-An Overview", Publication No. PR-74, Center for Electromechanics—The University of texas at Austin, Apr. 12–14, 1988.

*Primary Examiner*—Steven L. Stephan
*Assistant Examiner*—Judson H. Jones
*Attorney, Agent, or Firm*—Fish & Neave; Thomas L. Secrest; Robert W. Morris

[57] ABSTRACT

A pulsed power linear actuator provides increased stroke force by converting rotational kinetic energy into linear kinetic energy through the use of electrical energy. The kinetic energy may be established by placing a tube having endless conductive loops therein between an armature and stator. Rotation of the tube by a motor generates rotational kinetic energy which is converted to linear kinetic energy and transferred to the stroke arm when current is applied to the armature to generate electromagnet fields. The armature may be implemented with permanent magnets which generate time invariant magnetic fields, or it may be implemented as a multi-segmented armature where each segment is essentially an individual armature. The relative motion of the armature and tube exposes the loops to the electromagnet fields and produces an electromotive force which induces current in the rotating endless loops. The induced current reacts with either the time invariant magnetic fields (in the permanent magnet configuration) or the electromagnet fields (in the multi-segment configuration) to cause a transfer of energy from the rotating tube to the stroke arm. A multi-stage actuator configuration may be implemented with the multi-segment armature and multiple sets of endless loops to provide increased stroke length to the actuator.

45 Claims, 9 Drawing Sheets

PULSED POWER LINEAR ACTUATOR AND METHOD OF INCREASING ACTUATOR STROKE FORCE

BACKGROUND OF THE INVENTION

This invention relates to pulsed power linear actuators and methods for controlling the stroke force of linear actuators, and more particularly to using kinetic energy and electromagnetism in controlling the stroke force and position of linear actuators.

The use of linear actuators is well known throughout various industries. For example, many manufacturing operations utilize linear actuators to control, with a high degree of precision, the movement of linear moving members. Prior mechanical linear actuators have relied on physical linkage between the drive mechanism and the stroke arm, thereby engendering friction and wear and so requiring lubricants. Even with lubricants, such actuators must often be replaced or reconditioned.

To avoid the problems caused by friction, actuators have been developed which use magnetic fields to support and separate components. These electromagnetic actuators essentially have no physical contact between their stationary and moving components. Without physical contact, no lubrication is necessary and little wear occurs, resulting in nearly unlimited life for the actuators under normal operating conditions.

Unfortunately, conventional electromagnetic actuators also have limitations which cause them to be complex, costly, and have restricted performance. For example, in conventional electromagnetic actuators, the output force of the actuator is typically determined as a function of an electrical input signal. This input signal may include a stored charge (i.e., capacitors) for producing a current pulse which creates induced currents in a driver component and forces the driver from its stationary position. One such apparatus is described in Zieve, U.S. Pat. No. 4,990,805. Zieve shows a bank of large, bulky capacitors which are required to create the forces necessary to properly operate the actuator. These capacitors severely limit the possible applications for such a device.

A conventional electromagnetic actuator which does not require a capacitively stored charge is described in Stuart et al. U.S. Pat. No. 5,099,158. Stuart describes a linear actuator having a coil made of at least two segments that are exposed to a magnetic flux source which generates flux in radially opposing directions. A command signal is applied to the center of the coil to cause current to pass through the segments in opposing directions producing an additive force (i.e., the sum of the force due to the inward radial flux and the force due to the outward radial flux). Even though this actuator generates a relatively large force from a relatively small input signal, the output force is still limited by the amplitude of the input signal. In addition, the input signal is applied to the coil by either brushes (which will wear out), or by physically connecting the coil to the moveable assembly (which severely restricts the stroke length and force with which the moveable assembly may move).

In recent years, there has been an increasing demand for linear actuators which have a high force per unit mass rating. This has been due to the desire to replace bulky, heavy, high-maintenance hydraulic systems with lighter, more reliable components in such applications as jet aircraft control surfaces and landing gear, and robotics. Conventional electromagnetic actuators simply cannot generate the force per unit mass required due to the fact that they draw all of their energy and power from a single electrical input.

In view of the foregoing, it is an object of this invention to provide improved linear actuators which derive energy and power from multiple sources to provide increased force per unit mass.

It is also an object of this invention to provide methods for driving linear actuators from multiple sources to provide increased force per unit mass.

It is another object of this invention to provide electromagnetic linear actuators which are uncomplicated, effective, reliable and inexpensive.

SUMMARY OF THE INVENTION

These and other objects of the invention are accomplished in accordance with the principles of the invention by providing linear actuators which utilize both electrical and kinetic energy to generate increased stroke force. Rotational kinetic energy is converted to linear kinetic energy and applied to the stroke arm in excess of the forces generated from the conventional application of electrical energy in traditional electromagnetic actuators. This additional energy provides a dramatic improvement in the force per unit mass applied by the stroke arm during the application of pulses lasting up to several seconds. For constant loads, the actuator applies forces which are equivalent to conventional electromagnetic actuator forces.

The linear actuator of the present invention includes a stroke arm having a proximal end for extension and a distal end. Located at the distal end is a conventional armature. The actuator also includes a housing embedded with at least one stator pole which is intended to interact magnetically with the armature. Located between the stator pole and the armature is a tube having a plurality of endless loops embedded therein. In the preferred embodiment, the tube is rotated by a motor to provide rotational kinetic energy to the actuator. Alternatively, the conventional armature itself may be rotated by the motor to provide the kinetic energy, or the tube may be configured as the stroke arm of the actuator, or both. In addition, the precise manner by which kinetic energy is supplied to the actuator may be varied without departing from the spirit of the invention.

When electrical current is applied to the armature, electromagnet fields are generated between the armature and the stator which induce currents to flow in the embedded loops. The induced currents interact with the electromagnet fields to create reactive forces (i.e., Lorentz forces) that cause the armature, and therefore the stroke arm to which it is mounted, to move (i.e., the rotating kinetic energy is converted to linear kinetic energy). This movement is further increased by the additional linear kinetic forces which are converted from the mechanical torque of the motor.

Another aspect of the invention involves applying permanent magnets to the armature which causes the armature to have a "rest" position. When a first polarity of direct current (DC) is applied to the armature, the armature moves in one direction and when the opposing polarity is applied, the armature moves in the opposite direction. The permanent magnets will cause the actuator to have an even greater force per ampere than previously described.

Still another aspect of the invention involves a multi-stage linear actuator having no permanent magnets. In this embodiment of the present invention, a plurality of armatures are formed into a single armature which is mounted within the housing of the actuator and a plurality of inductive structures (comprising a plurality of endless loops) are embedded axially within the tube. Additionally, each of the individual armatures is under separate electrical control. The individual armatures are sequentially activated and deactivated (typically, only one armature will be active at a time) causing the stroke arm to traverse the housing of the actuator. The stroke length is only limited by the number of inductive structures installed within the actuator.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
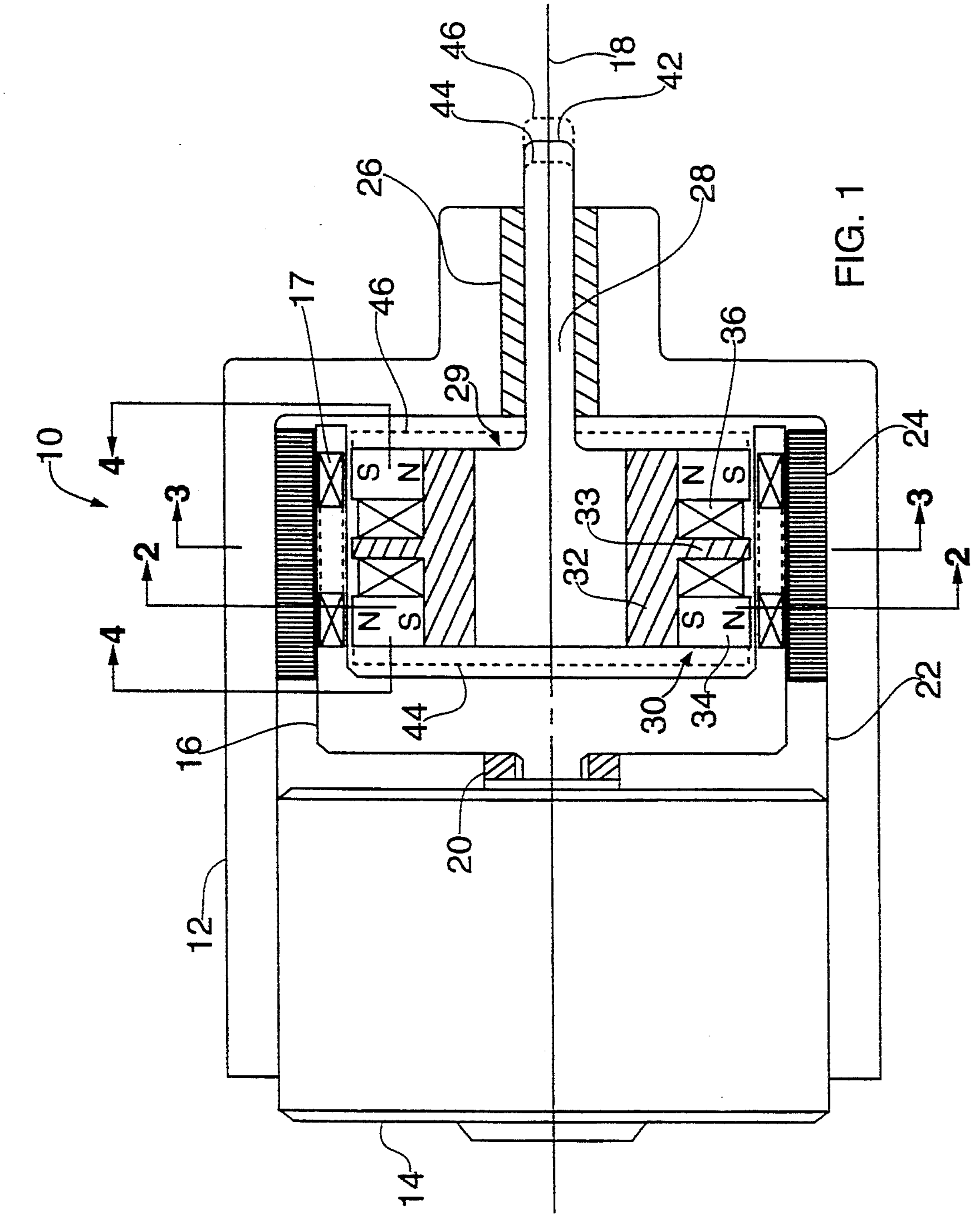
FIG. 1 is a longitudinal cross-sectional view of a linear actuator according to this invention.

Referring to FIG. 1, a preferred embodiment of a linear actuator 10 in accordance with the principles of the present invention is described. Linear actuator 10 includes a substantially cylindrical housing 12 having an opening at one end and an annular wall at the other end. Housing 12 may be formed as a single piece of high-strength fiber-epoxy, or it may be formed using multiple pieces of a non-magnetic material such as aluminum.

Mounted within the open end of housing 12 is a motor 14 which is connected to a tube 16 so that tube 16 is located within housing 12. A plurality of electrically conductive loops 17 are embedded within tube 16. When energized, motor 14 causes tube 16, and therefore loops 17, to rotate about an axis 18 which is parallel to the longitudinal axis of linear actuator 10. The rotational axis of tube 16 is connected to motor 14 through a thrust bearing 20 (which is mounted to motor 14) to improve the efficiency of the rotational movement by absorbing the large reactional forces that are applied to tube 16 during normal operation.

Housing 12 has an exposed inner surface 22 to which at least one stator 24 is mounted. Stator 24 is mounted between tube 16 and surface 22 such that only a small air gap exists between tube 16 and stator 24. Stator 24 is typically a cylinder formed from a laminated stack of magnetic material such as soft iron or steel (such that the material is only magnetized in the presence of a magnetic field). Alternatively, the stator may be formed from a solid magnetic material such as ferrite, or any other suitable material. As is well known in the art, the stator merely provides a complete magnetic path for the magnetic fields, thereby producing improved performance, and therefore, should not be considered a required component of the actuator.

A linear bearing 26 is mounted to the center of the annular wall of housing 12 such that the bearing is concentric with axis 18. The stroke arm of actuator 10 is provided by the proximal end of a shaft 28 that is mounted concentrically within bearing 26. An armature body 30 is mounted to the distal end of shaft 28 (collectively referred to as armature 29) within rotatable tube 16. Armature body 30 includes a lamination stack 32, which is constructed in a manner similar to that of stator 24 (and as such may also be formed from ferrite or other suitable material), but having individual poles 33, a plurality of permanent magnets 34, and a plurality of wound field coils 36. As previously described, the stroke arm of the actuator may alternatively be provided by the tube which would move axially with respect to the armature (not shown). In still another alternative configuration, the tube is stationary with respect to the rotational movement of the armature that is connected to the motor (not shown).

Figure 2:
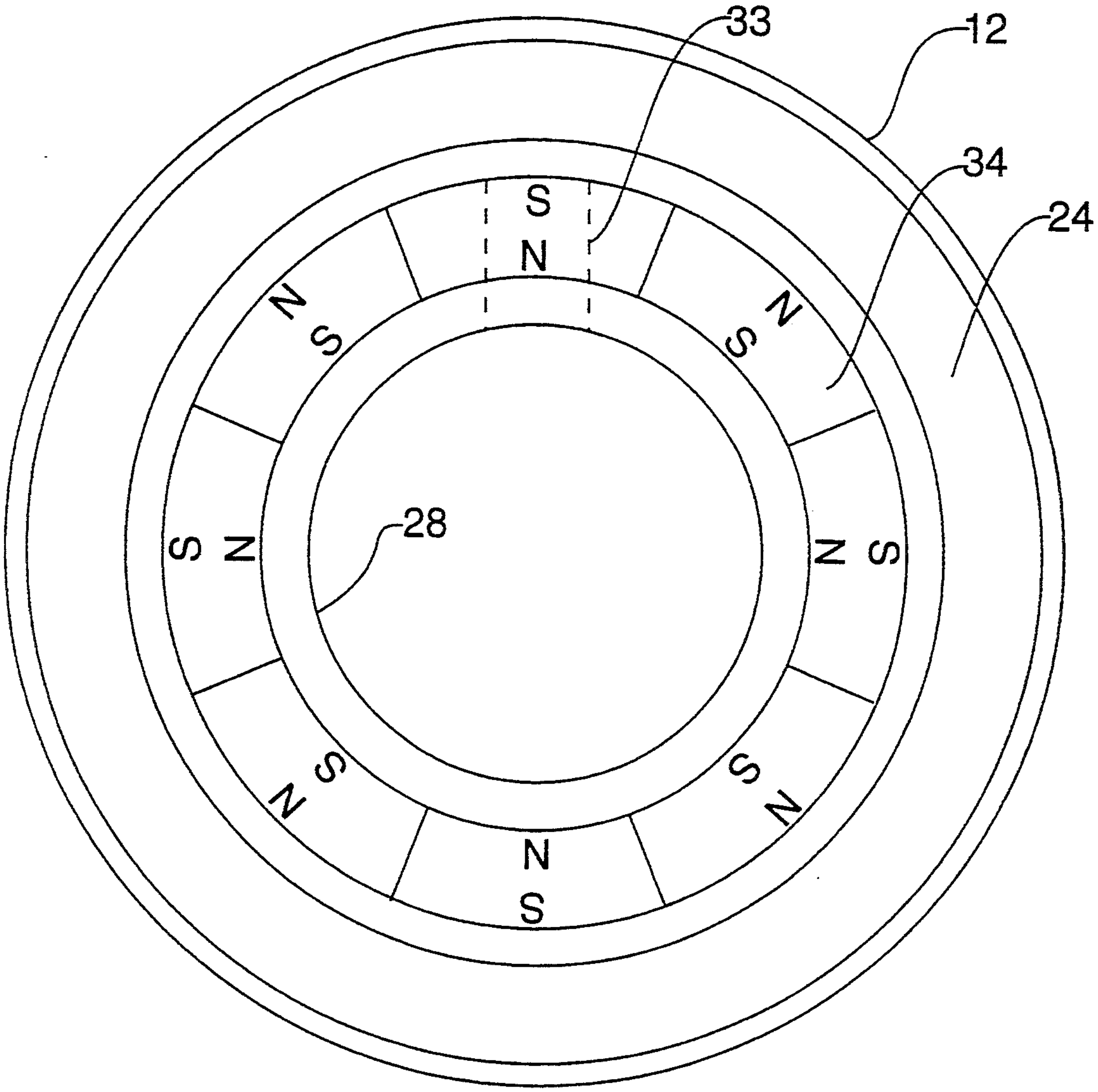
FIG. 2 is a radial cross-sectional view of the linear actuator of FIG. 1, taken from line 2—2 of FIG. 1.

The arrangement of permanent magnets 34 is shown in FIG. 2, where magnets 34 are shown having alternating polarity (for clarity, tube 16, loops 17 and lamination stack 32 have been omitted from FIG. 2). The permanent magnets 34 are aligned such that the center of each magnet (i.e., the location where the polarity is labeled on FIG. 2) is aligned with the center of each pole 33 (as shown by the dashed line in FIG. 2). Stator 24 and magnets 34 are configured to generate time invariant magnetic fields between them. Alternatively, magnets 34 could be replaced by constant current electromagnets which would also generate time invariant magnetic fields.

Figure 3:
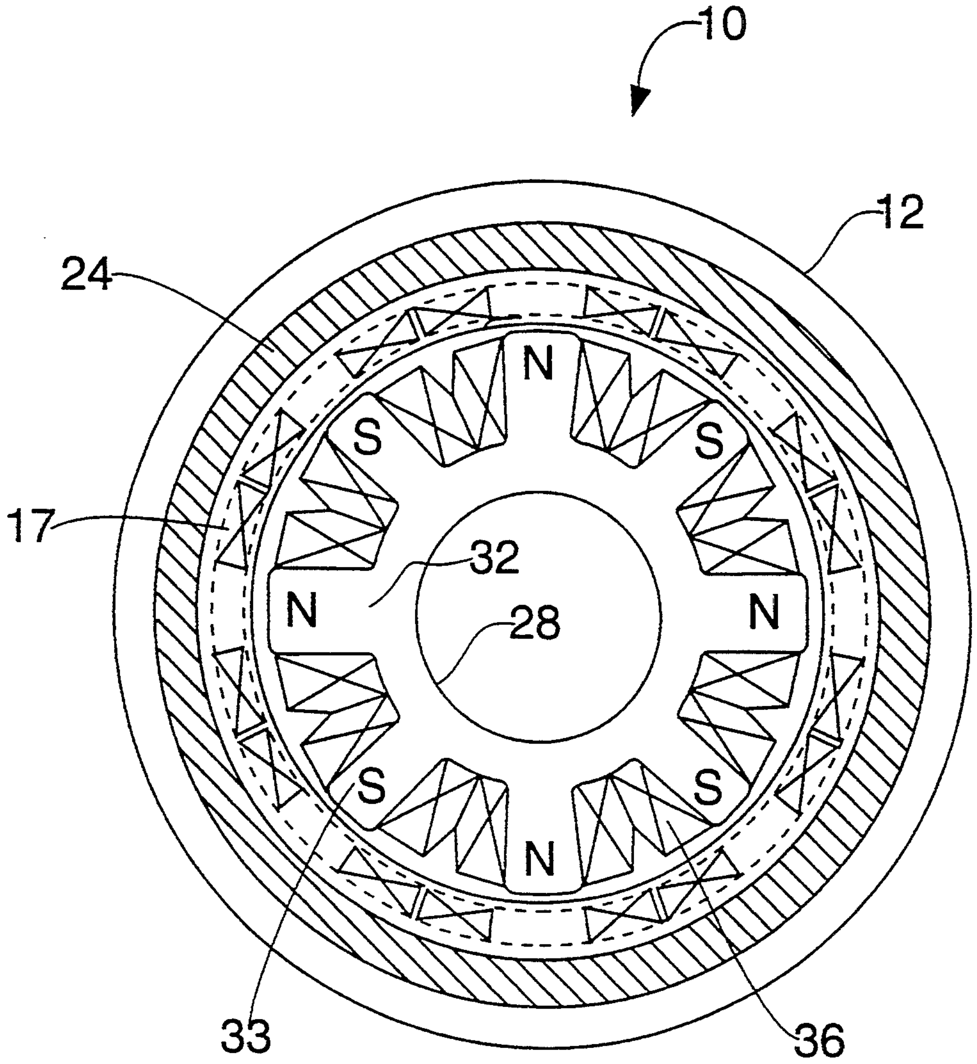
FIG. 3 is a radial cross-sectional view of the linear actuator of FIG. 1, taken from line 3—3 of FIG. 1.

FIG. 3 shows a radial cross-sectional view of linear actuator 10. More specifically, FIG. 3 shows lamination stack 32 being configured with a plurality of individual poles 33—eight poles in the present case, but the number of poles is not intended to in any way limit the scope of the invention. The number of poles selected for a given actuator is related to the size (i.e., diameter) and terminal inductance of the loops. FIG. 3 also shows poles 33 being alternating labeled in polarity (N designating north and S designating south). It should be clear to the practitioner that the poles are normally neutral and that polarity is only induced in the poles 33 when current is applied to field coils 36.

Figure 4A:
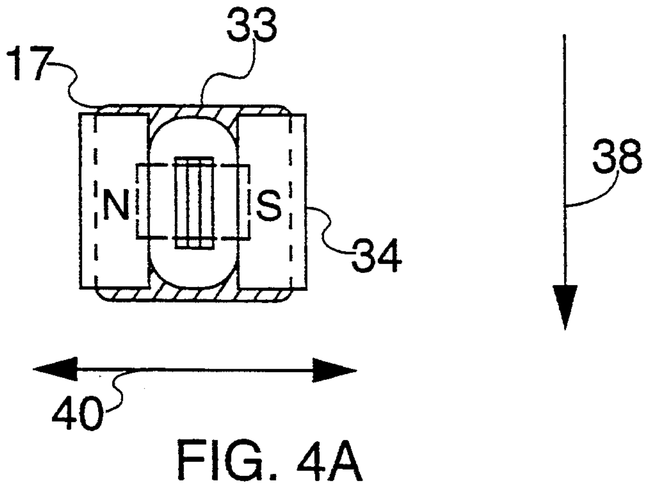
FIGS. 4A–4C are longitudinal partial cross-sectional views of the linear actuator of FIG. 1, taken from line 4—4 of FIG. 1, showing different positions of operation.
Figure 4B:
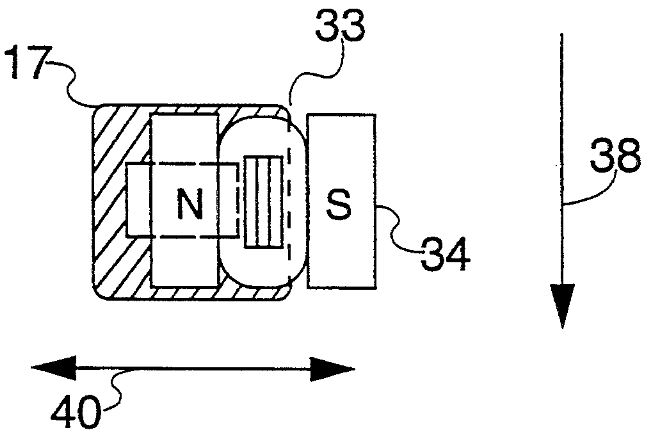
Figure 4C:
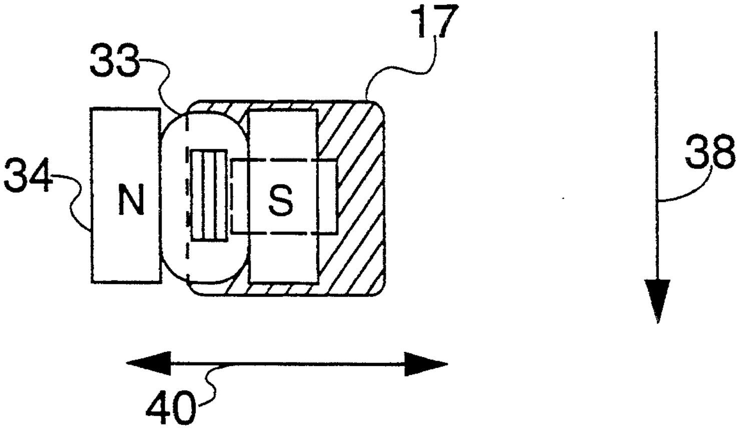

As shown in FIGS. 1 and 3, each pole 33 has a corresponding loop 17 which spans the longitudinal length of armature body 30. The loops 17 are embedded in tube 16 with only a small circumferential gap between each loop 17 such that the plurality of loops 17 essentially comprises a cylinder. This arrangement is more clearly seen in FIGS. 4A–4C which show a single loop 17 essentially centered over a single pole 33 (for clarity, housing 12, tube 16 and stator 24 have been omitted from FIGS. 4A–4C). Motor 14 rotates tube 16, and therefore loops 17, along a rotational axis 38, while armature 29 moves along a linear axis 40.

Each loop 17 may be a unitary piece of solid electrically conductive material, but preferably loop 17 is made up of turns of wire consisting of a plurality of electrical conductors which are electrically insulated from each other and are electrically connected together in parallel. One such wire, known as litz wire, is constructed of individual film-insulated wires which are bunched or braided together in a uniform pattern of twists and length of lay. This configuration reduces skin effect power losses of solid conductors, or the tendency of radio frequency current to be concentrated at the conductor surface. Properly constructed litz wires have individual strands each positioned in a uniform pattern moving from the center to the outside and back within a given length of the wire.

The manner in which conductive loops 17 affect linear actuator 10 is now described. Essentially, when current is applied to field coils 36, magnetic fields are generated between stator 24 and armature 29. As loops 17 rotate (on axis 18) through the fields, the relative motion between loops 17 and armature 29 produces an electromotive force (i.e., a voltage around each of the conductive loops) which induces current in loops 17. The induced currents interact with magnetic fields to cause counteracting forces to occur between loops 17 and armature 29 (in accordance with the Lorentz force law). In general, the lorentz force acting on a current loop is obtained from:

$$F = il \times B; \qquad (1)$$

where i represents current, l is a vector whose magnitude is the length of wire in the direction of current and B is the magnetic flux density vector (X represents a cross product function, not multiplication).

To achieve optimal performance from loop 17, the ratio of the inductance to resistance of loop 17, i.e., the inductive time constant, is chosen to match one-half the minimum time required to complete one phase (where one phase is the time required for the loop to travel its own length (D) in the direction of rotation) at maximum loop speed. This can be expressed as:

$$l/R = D/2v; \qquad (2)$$

where L is the terminal inductance of loop 17, R is the resistance of loop 17, D is the longitudinal dimension of loop 17 with respect to the path of loop 17 and v is the maximum surface speed of tube 16 (containing loop 17).

The operation of the preferred embodiment of actuator 10 will now be described. Actuator 10, which is best suited for bi-directional actuation applications, has three positions which are shown in FIG. 1 as rest position 42, reverse position 44 and forward position 46. The three distinct positions are merely shown for illustrative purposes—in practical applications, the actuator may stop at various intermittent positions between a center position and full extension in either direction. Typically, motor 14 is energized which causes tube 16 to continuously rotate about axis 18. Alternatively, as previously described, tube 16 may be stationary and armature 29 could instead be rotated (by attaching motor 14 to armature 29).

When no current is applied to wound coils 36, armature 29 remains at its rest position 42 (corresponding to the configuration shown in FIG. 4A), at least in part, because of the time invariant permanent magnetic fields which naturally exist between stator 24 and magnets 34. However, when a DC current of a first polarity (e.g., positive current) is applied to wound coils 36, an electromagnet field is established between stator 24 and armature 29. The electromagnet field interacts with loops 17 to produce electromotive forces which induce currents in loops 17. The relative motion between tube 16 and armature 29 induces currents in loops 17 which then interact with the permanent magnetic fields, producing lorentz forces which cause linear motion between stator 24 and armature 29 in a first direction, in this case to forward position 46 (corresponding to the configuration shown in FIG. 4B). More importantly, as previously described, the force with which armature 29 moves is generated from the conversion of mechanical energy (i.e., the rotational kinetic energy is converted to linear kinetic energy and transferred from motor 14 and loops 17 to armature 29 via the lorentz forces caused by the induced current interacting with the fields).

The linear force of actuator 10 is essentially powered by three inputs: the electrical power of coils 36 (which is the traditional input power for electromagnetic actuators), the mechanical power of motor 14 and the mechanical power of tube 16/loops 17. This relationship can be shown as follows:

$$V(t)\cdot i(t) + \tau_m(t)\cdot\omega(t) + \tau_l(t)\cdot\omega(t) = F_{arm}(t)\cdot v_{arm}(t) + \text{wasted heat}; \qquad (3)$$

where (t) represents "as a function of time", v is the voltage across coils 36, i is the current into coils 36, $\tau_m$ is the torque of motor 14, $\omega$ is the angular velocity of tube 16/loops 17, $\tau_l$ is the torque of tube 16/loops 17, $F_{arm}$ is the linear force on armature 29 and $v_{arm}$ is the linear velocity of armature 29. For long pulses (i.e., minutes), the significant term is $\tau_m(t)\cdot\omega(t)$, while for short pulses (i.e., seconds) the significant term is $\tau_l(t)\cdot\omega(t)$. Therefore, in actuator 10, the power from coils 36 provides little or no useful work on armature 29, which is in direct contrast to conventional electromagnetic actuators. It should be apparent that additional inertial mass could be added to tube 16 to increase the amount of available mechanical energy for short pulses. In addition, when a DC current of a second polarity (e.g., negative current) is applied to coils 36, lorentz forces are generated which cause armature 29 to move in the opposite direction along axis 18, in this case, to reverse position 44 (corresponding to the configuration shown in FIG. 4C).

Figure 5:
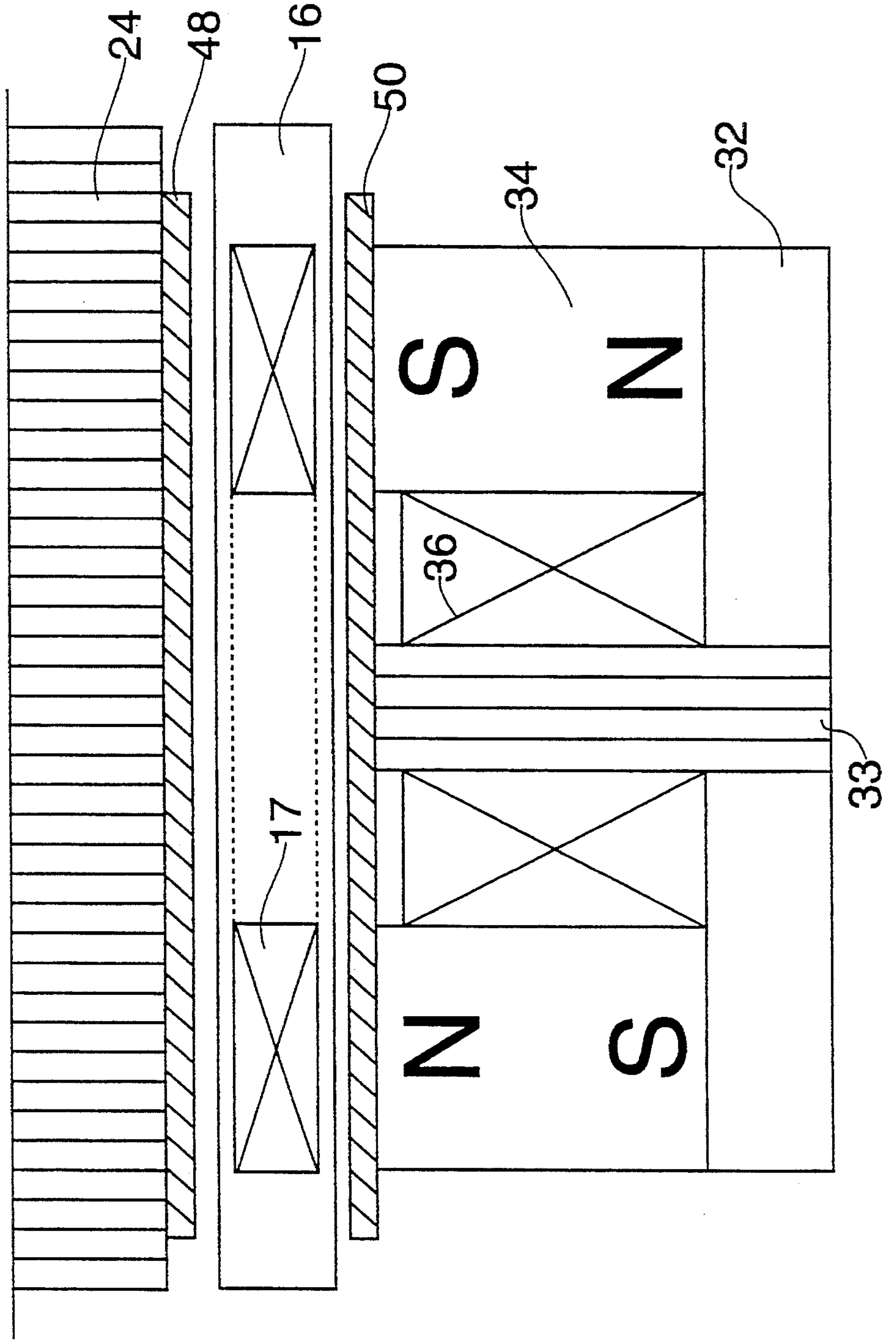
FIG. 5 is a cross-sectional detail view of an alternate embodiment of the linear actuator of FIG. 1 showing a stator, a conductive loop, a magnetic pole and a flux compensation member.

In certain configurations, such as when tube 16 is rotated at speeds in excess of about 100 meters per second or when the diameter of the actuator is greater than about 4 inches, the terminal inductance (L) of loops 17 may become excessive and may cause a reduction in the effectiveness of actuator 10. FIG. 5 shows a partial view of an alternate embodiment of linear actuator 10 in which flux compensation members 48 and 50 are employed to reduce the terminal inductance (L) of loops 17.

Flux compensation members 48 and 50 may comprise a full cylinder of electrically conductive material, such as copper or any other suitable material, which is placed in the air gap between rotating tube 16 and stator 24, and the air gap between rotating tube 16 and armature 29, respectively, or they may be formed of a number of discontinuous segments arranged to be coextensive with each pole on armature 29. Members 48 and 50 should be stationary with respect to stator 24 and armature 29, and therefore, may simply be adhered to the respective surfaces of stator 24 and armature 29.

Any induced current flowing in loop 17 generates magnetic fields in loop 17 which strike flux compensation members 48 and 50. These magnetic fields produce eddy currents in compensation members 48 and 50 which in turn generate magnetic fields of opposing direction to those generated by loop 17. The compensation member magnetic fields tend to substantially cancel out the loop magnetic fields thereby substantially reducing the terminal inductance (L) of loop 17 and increasing the effectiveness of actuator 10 (see equation (2) above).

Figure 6:
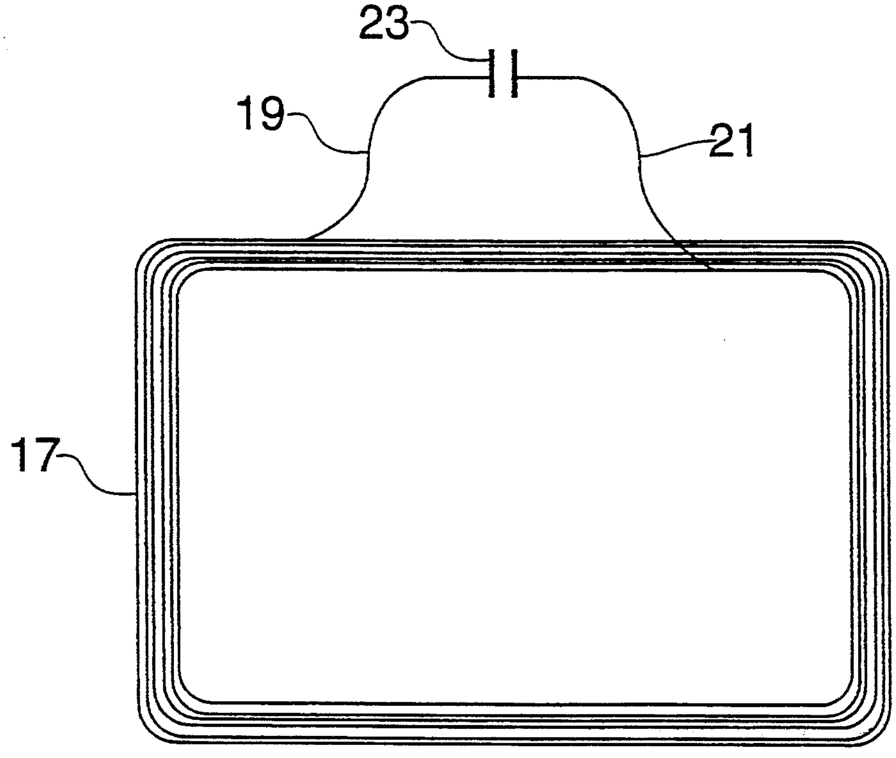
FIG. 6 is a partial schematic diagram of an alternate embodiment of the linear actuator of FIG. 1 showing conductive loops having reduced impedance.

FIG. 6 shows a partial view of another alternate embodiment of linear actuator 10 in which a capacitor 23 is employed to reduce the impedance of loop 17. Loop 17 of FIG. 6 is formed of individual film-insulated wires (litz wire) which are bundled together in a uniform pattern, as described above. A single strand of loop 17 is broken to form two ends 19 and 21 (i.e., merely the beginning and end of the series wound loop 17) which are connected in series to a capacitor 23 (so that the endless loop is maintained). Capacitor 23 will naturally act to reduce the impedance of loop 17. To further reduce the impedance of loop 17, actuator 10 may be constructed using both capacitor 23 and flux compensation members 48 and 50.

Figure 7:
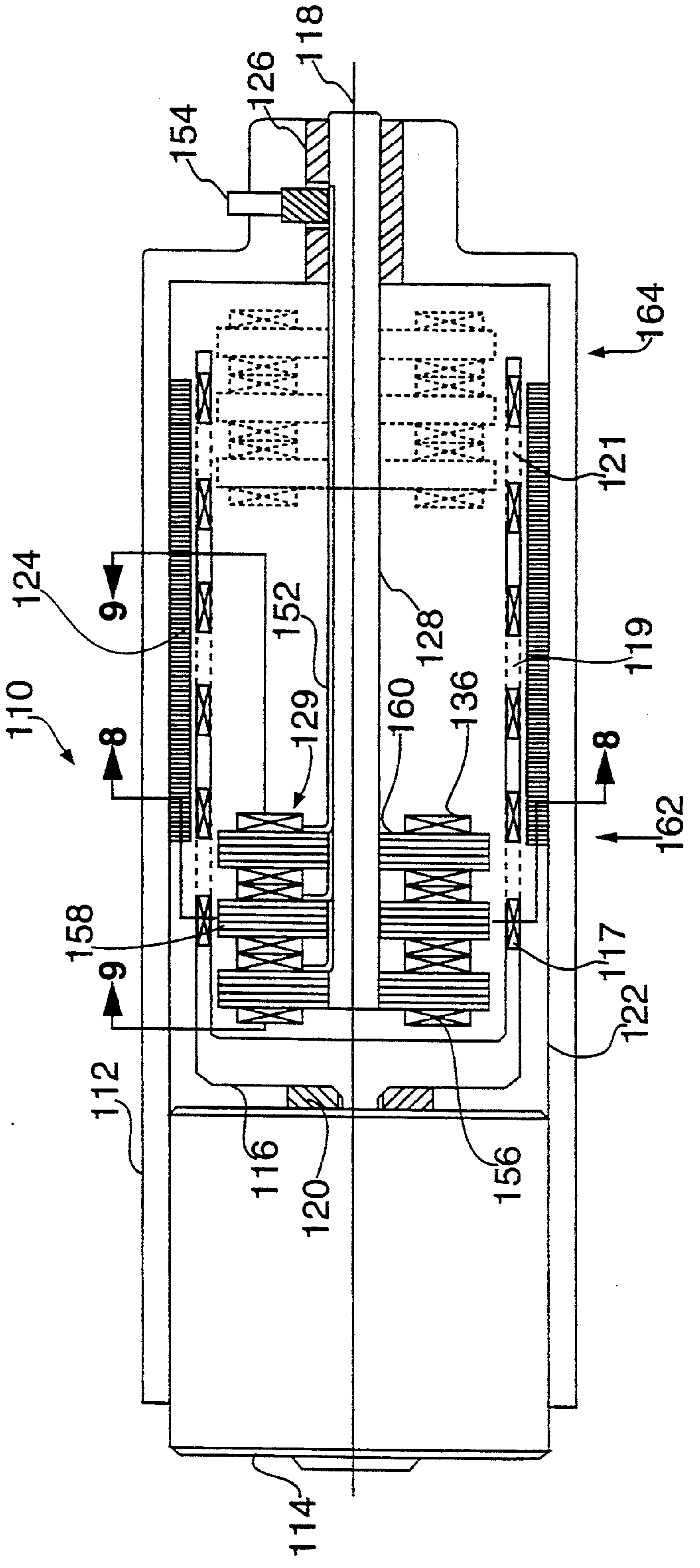
FIG. 7 is a longitudinal cross-sectional view of an alternate embodiment of a linear actuator according to this invention.

An alternate preferred embodiment of the present invention is shown in FIG. 7, for which a multi-stage actuator 110 is now described. Multi-stage actuator 110 may be constructed in accordance with many of the principles discussed above regarding single-stage actuator 10. One difference between actuators 10 and 110 is that actuator 110 does not use permanent magnets. Also, actuator 110 is configured with multiple sets of conductive loops (to provide a greater stroke extension for the actuator, as is described below), as well as having a unique armature configuration.

Multi-stage linear actuator 110 includes a substantially cylindrical housing 112 having an opening at one end and an annular wall at the other end. Housing 112 may be formed as a single piece of high-strength fiber-epoxy, or it may be formed using multiple pieces of non-magnetic material such as aluminum.

Mounted within the open end of housing 112 is a motor 114 which is connected to a tube 116 so that tube 116 is located within housing 112. Tube 116 has three sets of electrically conductive loops 117, 119 and 121 (each set of loops may also be referred to collectively as an inductive structure) embedded within its walls in the same manner as loops 17 are embedded in tube 16. The number of inductive structures partially determines the maximum extension of actuator 110. The choice to use three inductive structures in the present example is merely an arbitrary selection and not meant to limit the scope of the invention. When energized, motor 114 causes tube 116, and therefore loops 117, 119 and 121, to rotate about axis 118 which is parallel to the longitudinal axis of actuator 110. To achieve optimal rotational efficiency, tube 116 is supported by a thrust bearing 120 which is fixedly connected to motor 114.

Housing 112 has an exposed inner surface 122 to which stator 124 is mounted. Stator 124 is typically a cylinder constructed from a laminated stack of magnetic material such as soft iron or steel and mounted between tube 116 and surface 122 such that only a small air gap exists between tube 116 and the inside surface of stator 124. Alternatively, it may be possible to break stator 124 into separate stators (not shown) such that a smaller stator is installed for each inductive structure. Such an installation reduces the weight of actuator 110, but increases the complexity of construction and operation.

A linear bearing 126 is mounted to the center of the annular wall of housing 112 such that the bearing is concentric with axis 118. The stroke arm of actuator 110 is provided by the proximal end of a shaft 128 that is mounted concentrically within bearing 126. An armature 129 is fixedly connected to the distal end of shaft 128 within rotatable tube 116.

Armature 129, which does not include permanent magnets, actually comprises three individual armatures 156, 158 and 160 which are fixedly mounted next to each other beginning at the distal end of shaft 128. Armatures 156, 158 and 160 are typically formed from a lamination stack in a manner similar to that of stator 124, but have individual poles (see FIG. 8) rather than the cylindrical shape of the stator. A plurality of field coils 136 are wound to the poles of each armature and are connected to a contact 152 (having three individual rails) such that each individual armature can be selectively energized via contact 152. Contact 152 may extend the length of shaft 128 until it comes in contact with an electrical connector 154 (typically having a brush interface), which is orthogonally mounted within linear bearing 126, to provide an interface from the individual armatures to control circuitry (not shown).

Figure 8:
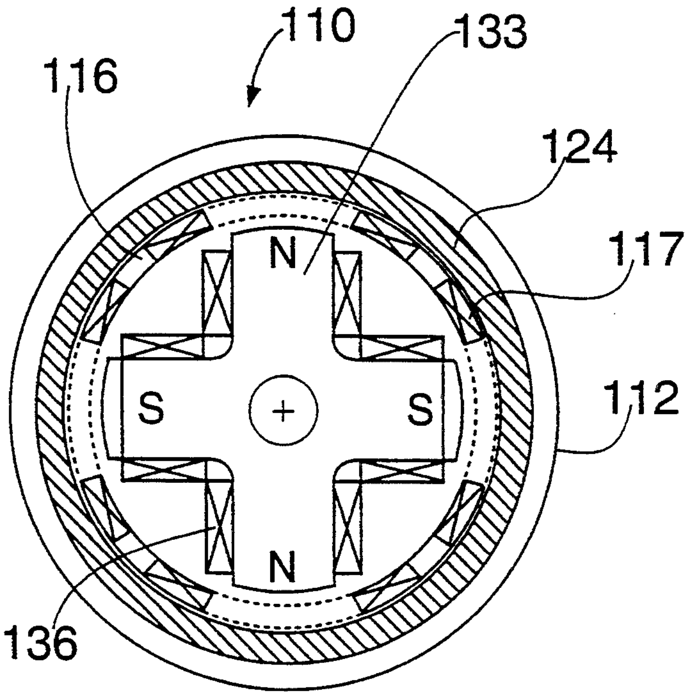
FIG. 8 is a radial cross-sectional view of the linear actuator of FIG. 7, taken from line 8—8 of FIG. 7.

FIG. 8 shows a radial cross-sectional view of multi-stage linear actuator 110. More specifically, FIG. 8 shows individual armature 158 configured with four poles, but, as previously described, the number of poles is not intended to in any way limit the scope of the invention. It should be noted that for proper operation, each of the individual armatures 156, 158 and 160 should have an identical number of poles, but the poles of one individual armature may be aligned at an angle which is offset from the poles of another individual armature (in such a configuration, the individual armatures would not appear as a single armature when viewed radially). It should also be noted that even though the poles are labeled with alternating polarity in FIG. 8, they are normally neutral and that the alternating polarity is induced in the poles only when current passes through the corresponding field coils 136.

As shown in FIGS. 7 and 8, one loop 117 is used for each "pole" of armature 129, not for each pole of the individual armatures 156, 158 and 160 (e.g., each individual armature of armature 129 has four poles, therefore the inductive structure has four loops 117, not twelve). The loop 117 spans most of the longitudinal length of armature 129. The loops 117 are embedded in tube 116 with a small gap between each successive loop 117 such that the plurality of loops 117 are substantially cylindrical. This arrangement is more clearly seen in FIGS. 9A–9D which show a first loop 117 essentially centered over armature 129 (for clarity, housing 112, tube 116 and stator 124 have been omitted from FIGS. 9A–9D). Inductive structures 117, 119 and 121 are rotated by motor 114 in a rotational direction 172, while armature 129 moves in a linear direction 174. Alternatively, tube 116 may be stationary while armature 129 is rotated.

The inductive structures 117, 119 and 121 of actuator 110 operate in essentially the same manner as described above for loops 17. When current is applied to a corresponding armature, magnetic fields are generated between the armature and the stator. As the conductive loops rotate (on axis 118) through the magnetic fields, the relative motion produces an electromotive force which induces current in the loops. The induced current interacts with the fields causing counteracting lorentz forces to occur between the loops and the armature. Optimal performance from the inductive structures is also achieved when the ratio of the inductance to resistance of the inductive structures is chosen to match one-half the minimum time required to complete one phase at maximum loop speed (see formula (2) above).

The operation of multi-stage linear actuator 110 will now be described. Actuator 110 is best suited for applications requiring both increased stroke force and stroke distance. Although shown having three stages, multi-stage actuator 110 may be implemented with a single stage or any additional number of stages.

Referring to FIGS. 7–9, during normal operation, motor 114 is energized which causes tube 116 to continuously rotate about axis 118. When no current is applied to armature 129 (i.e., any of the individual armatures), armature 129 may remain at rest position 162, or at whatever the previous position was (for example, see FIG. 9A). When a current is applied to individual armature 160 (irrespective of the direction of flow), a field is established between stator 124 and armature 160. The relative motion between tube 116 and armature 129 produces an electromotive force which induces current in the affected loops (i.e., 117, 119 or 121). The established field interacts with the induced current to create a lorentz forces which tend to move armature 129 in the direction from rest position 162 to first position 166 (see FIG. 9B). The force of this movement is significantly greater than the force of the movement of a conventional electromagnetic actuator because of the lorentz forces created by the current which is induced in loops 117 and the transfer of rotational kinetic energy from motor 114 and tube 116 to armature 129, as previously described.

When armature 129 has reached first position 166, pole 133 of individual armature 160 is essentially beyond the influence of loops 117 and the stroke force would normally begin to drop off. At this point, the current supply to armature 160 is turned off and current is supplied to individual armature 158, which is now in the same position as armature 160 was when actuator 110 was activated. Accordingly, armature 158 causes the stroke force to be maintained at the same increased level between first position 166 and a second position 168 (see FIG. 9C). When second position 168 is reached, armature 158 is turned off and current is applied to armature 156, which is now is the same position as armature 160 before actuator 110 was activated. It should be noted that the determination of shut-down/start-up times may be implemented in any conventional manner. For example, a simple timing schedule could be implemented so that each successive armature is energized after X time has passed, or a series of position sensors (not shown) could be installed within housing 12 to provide active feedback to sequencing circuitry (not shown).

Figure 9A:
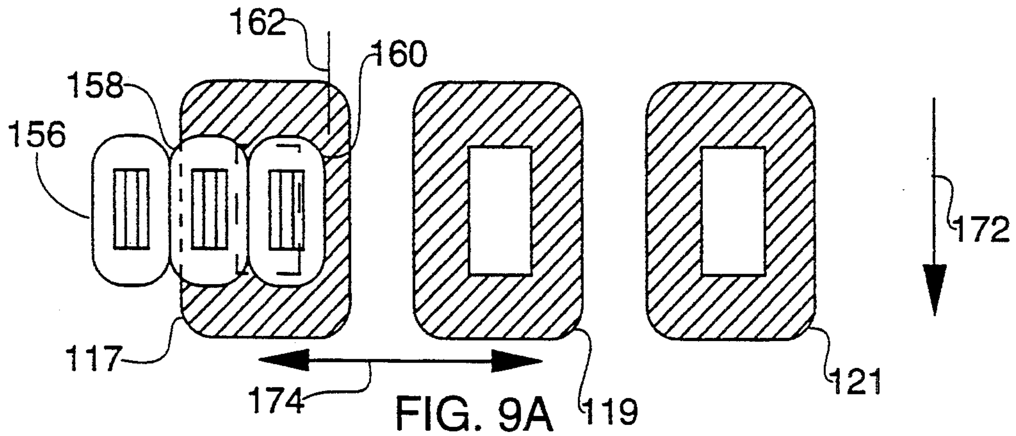
FIGS. 9A–9D are longitudinal partial cross-sectional views of the multi-stage linear actuator of FIG. 7, taken from line 9—9 of FIG. 7, showing a typical operational sequence (collectively referred to as FIG. 9).
Figure 9B:
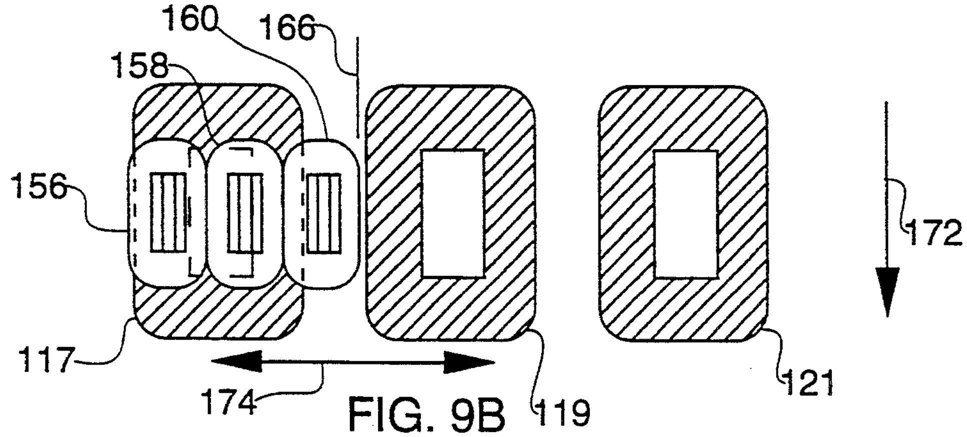
Figure 9C:
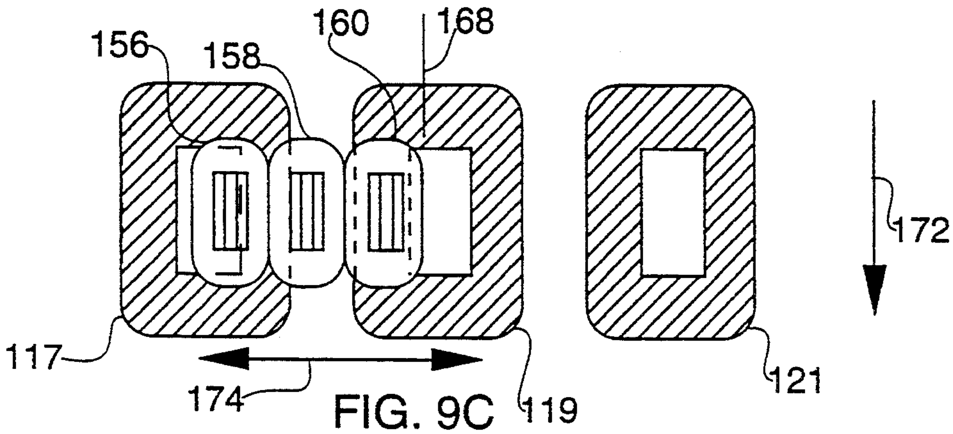
Figure 9D:
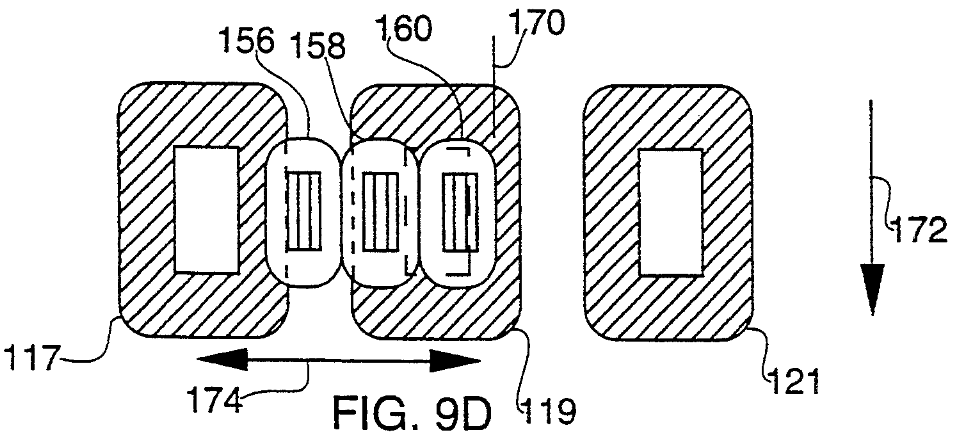

The application of current to armature 156 causes armature 129 to move from second position 168 to a third position 170 where stroke force will once again tend to fall off (see FIG. 9D). Significantly, armature 129 has moved along axis 118 so that individual armature 160 is now located beneath loops 119 in essentially the same configuration as it was under loops 117 at rest position 162. Therefore, the same sequence of events (i.e., the sequential application of current from armature 160 to armature 158 to armature 156) may be followed to move armature 129 further along axis 118 until it is beneath loops 121. Once again, the same sequence of operation may be applied to move actuator from loops 121 to a fully extended position 164. It should be clear that if the sequence of current application from individual armature to individual armature is essentially reversed, shaft 128 will be retracted (which may occur at any point after rest position 162 by energizing the individual armature which is substantially aligned with the previous loop).

It should be noted that multi-stage actuator 110 may be operated as a single throw, extended stroke length, linear actuator. Alternatively, actuator 110 may be operated as a multi-stroke actuator having multiple positions of extension (e.g., the actuator shown in FIG. 7 may be controlled to stop at three different extension points which correspond to each of the inductive structures 117, 119 and 121). Additionally, it should be noted that current should be applied to primarily only one individual armature at a time, and that the performance of actuator 110 may be enhanced by applying the compensation techniques shown in FIGS. 5 and 6 (as applied to actuator 10) to actuator 110.

It will be understood that the foregoing is only illustrative of the principles of the invention, and that various modifications can be made by those skilled in the art without departing from the scope and spirit of the invention. For example, the armature of the multi-stage actuator may be constructed of any number of individual armatures instead of the three individual armature configuration which has been described.

I claim:

1. A pulse power linear actuator, comprising:

energy conversion means located circumferentially about a first axis, the energy conversion means comprising electrically conductive means;

field generation means comprising an axial member whose axis is concentric with the first axis, the field generation means creating magnetic fields in response to an applied current; and rotational motion generation means which generates relative rotational motion between the energy conversion means and the axial member such that when the current is applied, the electrically conductive means is exposed to the magnetic fields causing an electromotive force which induces current in the electrically conductive means, the induced current interacts with the magnetic fields to produce lorentz forces which cause relative axial movement between the axial member and the energy conversion means.

2. The pulse power linear actuator of claim 1, wherein the electrically conductive means comprises:

a plurality of electrically conductive endless loops embedded essentially circumferentially within a tube which is connected to the motion generation means to cause the tube to rotate about the field generation means such that the loops are periodically exposed to the fields.

3. The pulse power linear actuator of claim 2, wherein the field generation means further creates time invariant magnetic fields such that the lorentz forces are produced by the induced current interacting primarily with the time invariant magnetic fields.

4. The pulse power linear actuator of claim 3, wherein the field generation means further comprises:
- an armature comprising a laminated stack of soft magnetic material, the armature being the axial member, the laminated stack having a plurality of individual poles which have a plurality of field coils wound around the poles; and
- a substantially cylindrical stator formed from a laminated stack of soft magnetic material located substantially around the energy conversion means.

5. The pulse power linear actuator of claim 4, wherein the linear actuator further comprises flux compensation means comprising:
- a first cylinder of electrically conductive material mounted between the rotating tube and the stator such that the first cylinder is stationary with respect to the stator; and
- a second cylinder of electrically conductive material mounted between the rotating tube and the armature such that the second cylinder is stationary with respect to the armature, so that the flux compensation means provides opposing magnetic fields which substantially cancel magnetic fields generated by the induced current in the loops, the cancellation causing a reduction in terminal inductance of the loops.

6. The pulse power linear actuator of claim 4, wherein the linear actuator further comprises a capacitor connected in series within the endless loops which causes a reduction in impedance of the loops.

7. The pulse power linear actuator of claim 4, wherein the armature further comprises a plurality of permanent magnets aligned with the poles which create time invariant magnetic fields such that:
- when no current is applied to the armature, the armature is located in a first position;
- when current of a first polarity is applied to the armature, the armature moves in a first axial direction to a second position; and
- when current of a second polarity is applied to the armature, the armature moves in a second axial direction, which is opposite the first direction, to a third position.

8. The pulse power linear actuator of claim 7, wherein the first and third positions coincide.

9. The pulse power linear actuator of claim 4, wherein the armature further comprises a plurality of constant current electromagnets aligned with the poles which create the time invariant magnetic fields such that:
- when no current is applied to the armature, the armature is located in a first position;
- when current of a first polarity is applied to the armature, the armature moves in a first axial direction to a second position; and
- when current of a second polarity is applied to the armature, the armature moves in a second axial direction, which is opposite the first direction, to a third position.

10. The pulse power linear actuator of claim 9, wherein the first and third positions coincide.

11. The pulse power linear actuator of claim 2, wherein the loops have an inductive time constant which is ideally about one-half the minimum time required for the loops to travel their own length in the direction of rotation at about maximum speed.

12. A pulse power linear actuator, comprising:
- a housing having first and second ends;
- an essentially cylindrical tube mounted within the housing on an axis;
- a plurality of endless electrically conductive loops embedded essentially cylindrically within the tube;
- a field generator for generating time invariant magnetic fields and for generating magnetic fields, the field generator comprising an axial member which is concentric with the axis, the field generator being located within the housing such that the conductive loops are periodically exposed to the generated fields;
- a motor mounted at the first end of the housing, the motor being connected to cause continuous relative rotational movement between the tube and the axial member; and
- a current source for applying current to the field generator to cause the field generator to generate magnetic fields such that the relative motion between the tube and the axial member produces an electromotive force which induces current in the exposed loops, the induced current interacting with the magnetic fields to produce lorentz forces that cause relative axial movement between the axial member and the tube.

13. The pulse power linear actuator of claim 12, wherein the field generator further creates time invariant magnetic fields, the field generator further comprising:
- an armature fixedly attached to an axial shaft which is supported by and extends through the second end of the housing, the armature being the axial member and being substantially aligned with the loops within the tube, the armature comprising a laminated stack of soft magnetic material which is formed into a plurality of individual poles having a plurality of field coils wound around the poles; and
- a substantially cylindrical stator formed from a laminated stack of soft magnetic material which is located within the housing such that the stator substantially surrounds the loops, wherein:
- the lorentz forces are produced by the induced current interacting primarily with the time invariant magnetic fields.

14. The pulse power linear actuator of claim 13, wherein the linear actuator further comprises flux compensation means comprising:
- a first cylinder of electrically conductive material mounted between the tube and the stator such that the first cylinder is stationary with respect to the stator; and
- a second cylinder of electrically conductive material mounted between the tube and the armature such that the second cylinder is stationary with respect to the armature, so that the flux compensation means provides opposing magnetic fields which substantially cancel magnetic fields generated by the induced current in the loops, the cancellation causing a reduction in terminal inductance of the loops.

15. The pulse power linear actuator of claim 13, wherein the linear actuator further comprises a capacitor connected in series within the endless loops which causes a reduction in impedance of the loops.

16. The pulse power linear actuator of claim 13, wherein the armature further comprises a plurality of permanent magnets aligned with the poles such that:

when no current is applied to the armature, the armature remains in a first position;

when current of a first polarity is applied to the armature, the armature moves in a first axial direction to second position; and when current of a second polarity is applied to the armature, the armature moves in a second axial direction, which is opposite the first direction, to axial third position.

17. The pulse power linear actuator of claim 16, wherein the first and third positions coincide.

18. The pulse power linear actuator of claim 13, wherein the armature further comprises a plurality of constant current electromagnets aligned with the poles which create the time invariant magnetic fields such that:

when no current is applied to the armature, the armature is located in a first position;

when current of a first polarity is applied to the armature, the armature moves in a first axial direction to a second position; and when current of a second polarity is applied to the armature, the armature moves in a second axial direction, which is opposite the first direction, to a third position.

19. The pulse power linear actuator of claim 18, wherein the first and third positions coincide.

20. The pulse power linear actuator of claim 12, wherein the loops have an inductive time constant which ideally is about one-half the minimum time required for the loops to travel their own length in the direction of rotation at about maximum speed.

21. A multi-stage pulse power linear actuator, comprising:

energy conversion means located circumferentially about a first axis, the energy conversion means comprising a plurality of inductive structures which comprise electrically conductive means;

electromagnet field generation means comprising a plurality of axially mounted members which are fixedly connected together and to an axial shaft to form a single axial member whose axis is concentric with the first axis, the field generation means creating a selected one of a plurality of electromagnet fields in response to a selected applied current; and rotational motion generation means which generates relative motion between the energy conversion means and the axial member such that when the selected current is applied, the electrically conductive means is exposed to the electromagnet fields causing an electromotive force which induces current in the electrically conductive means, the induced current interacts with the electromagnet fields to produce lorentz forces that cause relative axial movement between the axial member and the energy conversion means.

22. The multi-stage pulse power linear actuator of claim 21, wherein the plurality of inductive structures, which are axially embedded within a tube which rotates about the field generation means, comprises:

a plurality of electrically conductive endless loops embedded essentially circumferentially within the tube such that the loops are periodically exposed to the electromagnet fields.

23. The multi-stage pulse power linear actuator of claim 22, wherein the field generation means further comprises:

an armature comprising a plurality of laminated stacks of soft magnetic material fixedly attached to the distal end of a shaft, the armature being the axial member, each of the laminated stacks having a plurality of individual poles which have a plurality of field coils wound around the poles and means for selectively applying current to each individual stack; and at least one substantially cylindrical stator formed from a laminated stack of soft magnetic material which is arranged to substantially surround the inductive structures.

24. The multi-stage pulse power linear actuator of claim 23, wherein current is individually, sequentially, applied to each of the stacks, beginning with the stack farthest from the distal end, to cause the armature to move in a first direction from being aligned with a first inductive structure to being aligned with a second inductive structure, at which point the sequential application of current may be reapplied.

25. The multi-stage pulse power linear actuator of claim 24, wherein the sequence of current application is essentially reversed to cause the armature to move in a second direction which is opposite the first direction.

26. The multi-stage pulse power linear actuator of claim 23, wherein the linear actuator further comprises flux compensation means comprising:

a first cylinder of electrically conductive material mounted between the rotating tube and the stator such that the first cylinder is stationary with respect to the stator; and a second cylinder of electrically conductive material mounted between the rotating tube and the armature such that the second cylinder is stationary with respect to the armature, so that the flux compensation means provides opposing magnetic fields which substantially cancel magnetic fields generated by the induced current in the loops, the cancellation causing a reduction in terminal inductance of the loops.

27. The multi-stage pulse power linear actuator of claim 23, wherein the linear actuator further comprises a capacitor connected in series within the endless loops which causes a reduction in impedance of the loops.

28. The multi-stage pulse power linear actuator of claim 22, wherein the loops have an inductive time constant which ideally is about one-half the minimum time required for the loops to travel their own length in the direction of rotation at about maximum speed.

29. A multi-stage pulsed power linear actuator, comprising:

a housing having first and second ends;

an essentially cylindrical tube mounted within the housing on an axis;

a plurality of inductive structures axially embedded within the tube, each inductive structure being a plurality of endless electrically conductive loops which are essentially cylindrical about the tube;

a field generator for generating a plurality of electromagnet fields, the field generator comprising a plurality of axially mounted members which are fixedly connected together and to an axial shaft to form an axial member concentric with the axis, the field generator being located within the housing such that the inductive structure which is substantially aligned with the field generation means has loops that are periodically exposed to the generated fields;

a motor mounted at the first end of the housing, the motor causing continuous relative rotational movement between the tube and the axial member; and a current source for selectively applying current to one of the plurality of axially mounted members of the field generator to cause the field generator to generate a selected electromagnet field such that the relative motion between the tube and the axial member produces an electromotive force which induces current in the exposed loops, the induced current interacting with the field to produce lorentz forces that cause relative axial movement between the axial member and the tube.

30. The multi-stage pulse power linear actuator of claim 29, wherein the field generator further comprises:

an armature comprising a plurality of laminated stacks of soft magnetic material fixedly attached to the distal end of a shaft which is supported by and extends through the second end of the housing, the armature being the axial member and being substantially aligned with one of the inductive structures within the rotating tube, each of the laminated stacks having a plurality of individual poles which have a plurality of field coils wound around the poles and means for selectively applying current to each individual stack; and at least one substantially cylindrical stator formed from a laminated stack of soft magnetic material which is located within the housing such that the stator substantially surrounds the inductive structures.

31. The multi-stage pulse power linear actuator of claim 30, wherein current is individually, sequentially, applied to each of the stacks, beginning with the stack farthest from the distal end, to cause the armature to move in a first direction from being aligned with a first inductive structure to being aligned with a second inductive structure, at which point the sequential application of current may be reapplied.

32. The multi-stage pulse power linear actuator of claim 31, wherein the sequence of current application is essentially reversed to cause the armature to move in a second direction which is opposite the first direction.

33. The multi-stage pulse power linear actuator of claim 30, wherein the linear actuator further comprises flux compensation means comprising:

a first cylinder of electrically conductive material mounted between the rotating tube and the stator such that the first cylinder is stationary with respect to the stator; and a second cylinder of electrically conductive material mounted between the rotating tube and the armature such that the second cylinder is stationary with respect to the armature, so that the flux compensation means provides opposing magnetic fields which substantially cancel magnetic fields generated by the induced current in the loops, the cancellation causing a reduction in terminal inductance of the loops.

34. The multi-stage pulse power linear actuator of claim 30, wherein the linear actuator further comprises a capacitor connected in series within the endless loops which causes a reduction in impedance of the loops.

35. The multi-stage pulse power linear actuator of claim 29, wherein the loops have an inductive time constant which is ideally about one-half the minimum time required for the loops to travel their own length in the direction of rotation at about maximum speed.

36. A method for providing increased stroke force in a pulse power linear actuator, comprising the steps of:

producing time invariant magnetic fields;

generating kinetic energy by creating relative rotational motion between a tube and an axial member of a field generator, the tube being embedded with a plurality of electrically conductive endless loops and the field generator comprising an armature fixedly connected to a shaft to comprise the axial member;

applying current to the field generator to generate an electromagnet field which, combined with the relative motion between the tube and the armature, periodically exposes the rotating endless loops to the electromagnet field and produces electromotive forces which induce current in the endless loops, the induced current interacting with the time invariant magnetic fields to produce lorentz forces which move the moveable member in an axial direction.

37. The method of claim 36, wherein the armature comprises a laminated stack of soft magnetic material which is formed into individual poles that have a plurality of field coils wound around them and a plurality of permanent magnets aligned with the poles, the step of applying current further comprising the steps of:

applying no current such that the moveable member remains in a first position;

applying current of a first polarity which causes the moveable member to move in a first axial direction to a second position; and applying current of a second polarity which causes the moveable member to move in a second axial direction, which is opposite the first direction, to a third position.

38. The method of claim 37 wherein the first and third positions coincide.

39. The method of claim 36, further comprising the step of providing flux compensation means to the surfaces of the tube to substantially cancel magnetic fields which are generated by the induced current, thereby causing a reduction in terminal inductance in the loops, the flux compensation means being relatively stationary with respect to the armature and stator.

40. The method of claim 36, further comprising the step of providing a reduction of impedance in the endless loops by connecting a capacitor in series with the endless loops.

41. A method for providing increased stroke force in a multi-stage linear actuator, comprising the steps of:

generating kinetic energy by creating relative rotational motion between a tube and an axial member of a field generator, the tube being embedded with inductive structures which comprise electrically conductive endless loops that are essentially cylindrical about the tube, the field generator comprising a plurality of individual armatures connected together and to a shaft to collectively comprise the axial member; and sequentially applying current to one of the individual armatures of the field generator to generate a plurality of electromagnet fields which, combined with the relative motion between the tube and the axial member, periodically exposes the rotating endless loops of the inductive structure which is substantially aligned with the active armature to produce electromotive forces which induce current in the exposed loops, the induced current interacting with the electromagnet fields to produce lorentz forces which move the axial member in an axial direction.

42. The method of claim 41, wherein each of the individual armatures comprises a laminated stack of soft magnetic material fixedly attached to the distal end of a shaft, the stacks are each formed into individual poles that have a plurality of field coils wound around them, the step of sequentially applying current further comprising the steps of:

applying current to the stack which is farthest from the distal end of the shaft, the stack being aligned with a first inductive structure, to cause the axial member to move in a first direction and deactivating the applied current when the stack is substantially beyond the exposed loops;

applying current to each additional stack in sequence, to continue to move the axial member in the first direction and deactivating the applied current when each stack is substantially beyond the exposed loops before applying current to the next sequential stack; and applying current to the stack at the distal end of the shaft to cause the axial member to be positioned so that the first stack is aligned with a second inductive structure, at which point the steps of selectively applying current may be repeated.

43. The method of claim 42, wherein the steps of selectively applying current are essentially performed in reverse order to cause the axial member to move in a second direction which is opposite the first direction.

44. The method of claim 41, further comprising the step of providing flux compensation means to the surfaces of the tube to substantially cancel magnetic fields which are generated by the induced current, thereby causing a reduction in terminal inductance in the loops, the flux compensation means being relatively stationary with respect to the armature and stator.

45. The method of claim 41, further comprising the step of providing a reduction of impedance in the endless loops by connecting a capacitor in series with the endless loops.

* * * * *

UNITED STATES PATENT AND TRADEMARK OFFICE

CERTIFICATE OF CORRECTION

PATENT NO. : 5,434,459

DATED : July 18, 1995

INVENTOR(S) : Joseph F. Pinkerton

It is certified that error appears in the above-indentified patent and that said Letters Patent is hereby corrected as shown below:

| Column | Line | Correction |
|---|---|---|
| 6 | 32-33 | Change " $V(t)\cdot i(t)+\tau_m(t)\cdot\omega(t)+\tau_l(t)\cdot\omega(t)=F_{arm}(t)\cdot v_{arm}(t)-$ + wasted heat " to -- $V(t)\bullet i(t) + \tau_m(t)\bullet\omega(t) + \tau_l(t)\bullet\omega(t) = F_{arm}(t)\bullet v_{arm}(t)$ + wasted heat --. |
| 6 | 34 | Change "v" to -- V --. |
| 9 | 57 | Change "is now is" to -- is now in --. |

Signed and Sealed this

Sixteenth Day of November, 1999

Attest:

Q. TODD DICKINSON

*Attesting Officer*

*Acting Commissioner of Patents and Trademarks*